Patented Feb. 16, 1932

1,845,370

UNITED STATES PATENT OFFICE

THEODORE B. WAGNER, OF BROOKLYN, NEW YORK

NEW COMPOSITION OF MATTER AND METHOD OF MAKING SAME

No Drawing.    Application filed June 13, 1928. Serial No. 285,224.

My present invention has for its object an improved composition of matter belonging to the class of cod liver oil preparations commonly designated as cod liver oil emulsions.

Emulsions are oleaginous suspensions of liquids, not miscible with water, in aqueous fluids and are obtained through the agency of gums or other colloid substances.

The therapeutic efficacy of cod liver oil seems to depend primarily upon its content of growth promoting vitamins and it is obvious that in such case its efficiency could be materially enhanced if it contained an adequate supply of substances necessary to the building up of bone material, calcium and phosphorus being foremost among such substances.

In my United States Letters Patent No. 1,716,286, granted on June 4, 1929, I have described a method for producing a calcium phosphorus compound or precipitate derived from the steepwater of corn and I have found that such calcium salt possesses valuable therapeutic properties, due largely to its high degree of assimilability.

The purpose of this invention is to so combine the calcium-phosphorus compound with cod liver oil as to effect a thorough emulsion.

In my United States Letters Patent, above referred to, I have mentioned the fact that if I do not filter the steepwater, the finished product or compound contains glutinous substances, originating in the corn, and I have found that these substances serve as stabilizers of cod liver oil emulsions in a manner akin to acacia which is the most generally employed emulsifying agent. I have found that I can replace acacia with my calcium-phosphorus compound to the extent of two thirds of the weight of the acacia; the emulsion obtained in this manner, is characterized by a markedly decreased viscidity.

I commingle thoroughly in a dry vessel, 40 parts, by weight, of finely pulverized acacia with 80 parts, by weight, of the calcium-phosphorus product, described in United States Letters Patent No. 1,716,286, granted to me on June 4, 1929, and then with 500 parts, by measure, of cod liver oil; after achieving a thorough mixture, I add, in one portion, 250 parts of water, by measure triturate the mixture or stir vigorously by mechanical means until a smooth and homogeneous mixture is obtained. Then I add, under constant agitation, 100 parts, by measure, of simple syrup (e. g. 65 parts of sucrose and 35 parts of water), and finally, work in sufficient water to bring the total volume of the emulsion to 1000 parts, by measure.

It is understood, of course, that, instead of using cod liver oil as such, I may employ the active principles (i. e. vitamin A and vitamin D) obtained therefrom in dry form, or otherwise, and I mean to include such step within the scope of my invention.

I claim:

1. A stable composition of matter comprising cod liver oil, water and sufficient calcium-phosphorus compound derived from the steepwater of corn to cause a stable emulsification of said oil and water whereby a stable product is produced which is devoid of emulsifying amounts of acacia.

2. A stable composition of matter comprising cod liver oil, water and sufficient calcium-phosphorus compound derived from the steepwater of corn to effect the homogenization of said oil and water as a stabilized emulsion devoid of emulsifying amounts of acacia.

3. A stable composition of matter comprising about 500 parts by weight of cod liver oil, and an aqueous solution containing about 40 parts by weight of acacia, and about 80 parts by weight of a calcium-phosphorus compound derived from the steepwater of corn whereby a stable emulsion is formed.

4. A stable composition of matter comprising about 500 parts of cod liver oil, about 280 parts of water, about 40 parts of acacia, about 80 parts of calcium-phosphorus compound derived from the steepwater of corn and about 100 parts of simple syrup whereby a stable emulsion is formed.

5. In the art of producing cod liver oil emulsion by means of acacia, that improvement which comprises replacing a substantial portion of the amount of acacia usually required for effecting emulsification of cod liver oil with a calcium-phosphorous compound derived from the steepwater of corn whereby a stable cod liver oil emulsion is produced.

THEODORE B. WAGNER.